Sept. 22, 1925.
A. RICCI
COMBINED SIEVE AND SHOVEL
Filed March 11, 1925
1,554,525
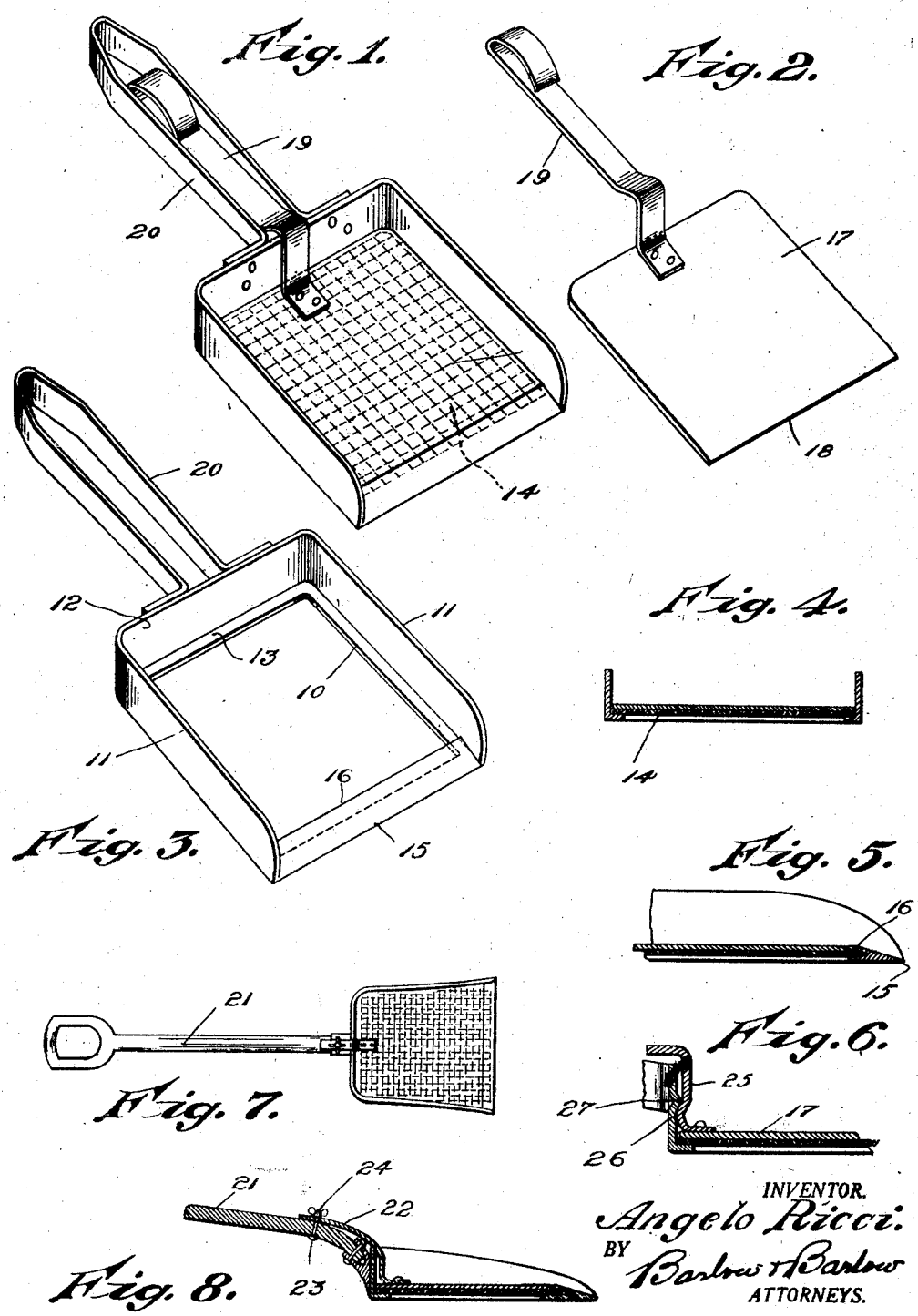

Patented Sept. 22, 1925.

1,554,525

UNITED STATES PATENT OFFICE.

ANGELO RICCI, OF PONTIAC, RHODE ISLAND.

COMBINED SIEVE AND SHOVEL.

Application filed March 11, 1925. Serial No. 14,687.

*To all whom it may concern:*

Be it known that I, ANGELO RICCI, a citizen of the United States, residing at Pontiac, in the county of Kent and State of Rhode Island, have invented certain new and useful Improvements in Combined Sieves and Shovels, of which the following is a specification.

This invention relates to a combined sieve and shovel; and has for its object to provide a frame with its open portion covered by a sieve screen, the device also having a separate plate shaped to cover the screen and removably retained in position on the frame over the screen, whereby the same may be readily used either as a sieve or a shovel, as desired.

A further object of this invention is to provide a lip on the forward edge of the screen frame to retain the forward edge of the shovel plate.

A further object of this invention is to provide means for temporarily locking or retaining the plate in set position in the frame and to be readily removed therefrom, whereby the device may be readily converted and used either as a shovel or sieve.

With these and other objects in view, the invention consists of certain novel features of construction, as will be more fully described, and particularly pointed out in the appended claims.

In the accompanying drawings:

Figure 1 is a perspective view showing my improved combined sieve and shovel as provided with a short handle and having the plate in position over the screen to form a shovel.

Figure 2 is a perspective view showing the shovel plate as removed from the screen frame and provided with a separate handle.

Figure 3 is a screen frame with both the shovel plate and the screen removed.

Figure 4 is a sectional edge elevation showing the screen covering the sieve frame opening and the shovel plate as positioned on the screen.

Figure 5 is a sectional side elevation showing the forward edge of the screen frame as provided with a lip under which the front beveled edge of the shovel plate extends to be retained therein, in operative position.

Figure 6 is a modification illustrating a resilient arm on the shovel plate and adapted to snap over a protuberance in the frame to releasably retain the plate in position.

Figure 7 is a side elevation illustrating a modified construction of fastening means for the shovel plate showing the same as rigidly securing the long handle of the shovel.

Figure 8 is a longitudinal section of a modification of the device.

It is often found in devices of this character of advantage to provide a combined sieve and shovel, particularly in handling coal and ashes, to be able to form the shovel with a screen covering the bottom portion of its frame and to provide a support and removable plate which may be readily positioned over the screen so that the device may be employed for either shoveling coal or sifting ashes. Then again, in other cases, where it is desired to sometimes sift and to sometimes shovel sand, it is found of advantage to provide a device which can be used for either; by removing the plate from the frame the device may be readily employed as a sieve for the sand, and when the plate is positioned the device may be employed as a scoop or shovel for shoveling sand; and the following is a detailed description of the present embodiment of my invention showing one means by which these advantageous results may be accomplished:—

With reference to the drawings, 10 designates the frame of the combined sieve and shovel, the same having opposite side walls 11 and a rear wall 12, the front wall being omitted providing an inwardly-turned flange portion 13 on which may be mounted and fixed the edges of the wire sieve screen 14.

This screen is preferably cut of a size to fit inside of the walls of the frame 10 and may be soldered, clamped or otherwise secured to this inturned edge flange 13 thereof. The forward edge of this frame is preferably formed sharp or thin as at 15 and is provided with a rearwardly-extending lip 16.

When it is desired to convert this sieve into a shovel, it is only necessary to provide a plate 17 of a size to fit inside of the screen frame and to extend the thin front edge 18 of this plate beneath the lip 16 of the frame and drop the plate in position over the screen. In some instances, I provide a handle 19 on this plate which projects into the opening of the shovel handle 20 whereby the hand of the user grasps both of these handles at once firmly holding the shovel plate in position during the shoveling operation.

In some instances when the device is provided with a long handle 21 the plate may be provided with an arm 22 through which a bolt 23 may be passed having a wing nut 24 thereon for releasably retaining the plate in position on the frame, while in other instances this plate may be provided at its rear edge with a resilient finger 25 which is provided with an offset portion 26 adapted to engage a protuberance 27 on the rear wall of the frame, whereby this finger may be snapped into position over the protuberance by the inherent spring of its stock to releasably retain the plate in its frame over the screen.

My improved device may be readily converted and be used either as a sieve or a shovel as desired.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

A device of the character described, comprising a shovel-like member having openings through the bottom thereof, a handle affixed to the rear wall of said member, a lip carried by the forward end thereof, a plate adapted to fit within the shovel-like member and spring means for retaining the plate in engagement with the lip.

In testimony whereof I affix my signature.

ANGELO RICCI.